United States Patent Office 3,529,720
Patented Sept. 22, 1970

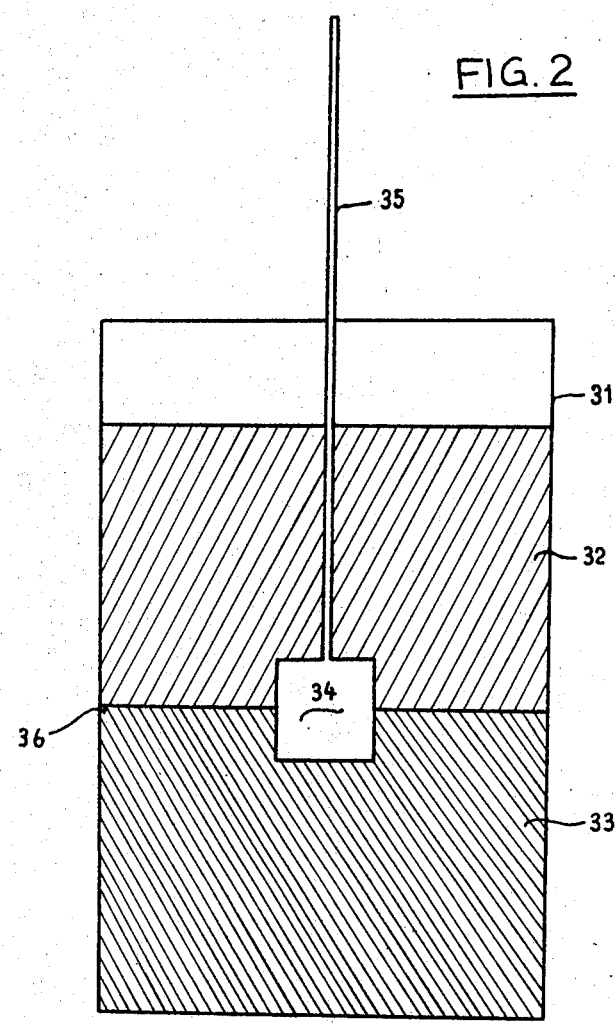

3,529,720
INSTALLATION FOR RECOVERY OF A LIQUID FLOATING ON A WATER SURFACE
Daniel Chablaix, 17 Route de Chavanne, 1007 Lausanne, Switzerland
Filed Apr. 8, 1968, Ser. No. 719,368
Claims priority, application Switzerland, Apr. 7, 1967, 4,972/67; Nov. 2, 1967, 15,390/67
Int. Cl. B01d *21/10*
U.S. Cl. 210—123                     8 Claims

ABSTRACT OF THE DISCLOSURE

This disclosure concerns an installation for the recovery of a liquid floating on the surface of a body of water, for example petroleum, characterized by the fact that it comprises a chamber for separating the liquid, and pumping means having a conduit connected thereto, the other end of the conduit being immersed and supported near the surface of the water. The chamber is divided into several compartments by transverse walls extending along a part of the height of the chamber and has a liquid entry in its lower part connected to the pump, an outlet for the water located at the bottom of the chamber, and an outlet conduit for the floating liquid leaving from the top of the chamber. The installation can be mounted in a boat, and a plurality of immersed conduits can be connected together by a belt of oil-impervious material positioned around an oil slick (for example), the surface area of which can be reduced to facilitate intake by the conduits, by reducing the perimeter of the belt.

---

The present invention has for its object an installation for the recovery of a liquid floating on the surface of water, for example petroleum, comprising a liquid separation chamber, pumping means, and a conduit one of whose extremities is connected to the pumping means and whose other extremity is immersed and supported near the water's surface.

The invention is characterized essentially by the fact that the separation chamber is divided into several compartments by two sets of transverse walls located alternately at different heights, a space remaining between the top of the upper walls and the ceiling of the separation chamber, which has a liquid inlet in its lower part, an outlet for water leaving from the bottom of the chamber, and an outlet for the floating liquid leaving from the top of the chamber, the said separation chamber being hermetically closed.

The accompanying drawing represents by way of example one embodiment of the installation according to the invention.

FIG. 2 shows in cross section a detail of a control and actuating device.

Figure 1:
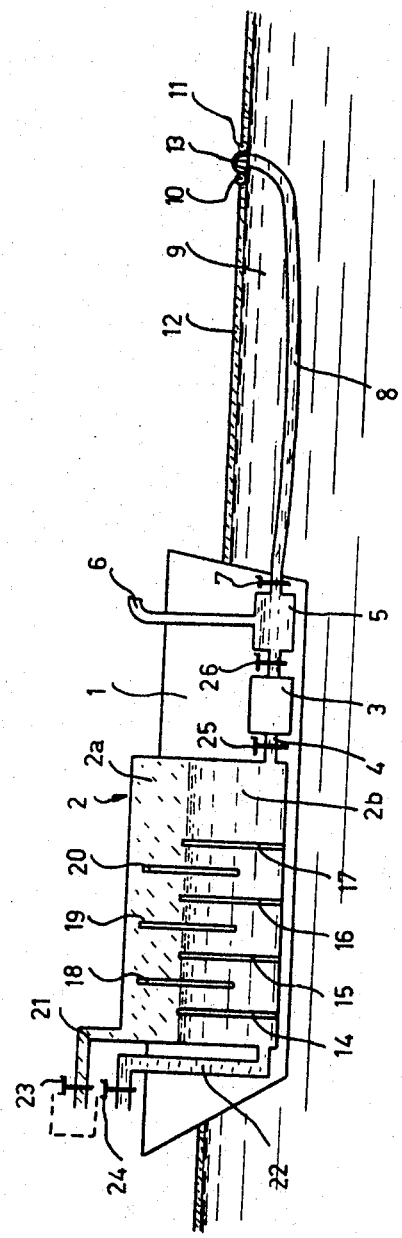
FIG. 1 shows a cross section of the installation.

FIG. 1 shows schematically a floating support 1, for example a specially constructed boat, comprising a liquid separation chamber 2, a pump 3, connected by conduit 4 to the separation chamber 2, and to a decompression chamber 5 connected to an air hose 6 for removing air or other gases mixed with the pumped liquid.

The decompression chamber 5 is connected through at least one valve 7 to at least one flexible tube 8, external of the boat 1, immersed in water 9 and whose free extremity is supported by floats 10 and 11 near the water level, the distance separating the opening of tube 8 from the water surface being determined by the thickness of the layer of liquid 12 floating on the water surface. The opening of tube 8 is additionally surmounted by a grating 13 which is inverted so as to form a cupola whose grill work is intended to retain solid bodies floating on the water surface.

The level of the extremity of tube 8 can advantageously be adjusted by means of floats having a variable flotation line realized by the introduction of a greater or lesser quantity of water in the bodies of the floats.

In order to obtain greater efficiency, there will be used preferably several tubes 8.

The separation chamber 2 has the shape of a rectangular enclave divided into several compartments by transverse walls 14, 15, 16, 17 rising from the bottom of the chamber to about half way up therein. These walls thus form a succession of basins successively filled with liquid arriving from pump 3 by flow of the liquid above the upper edge of the walls. Between walls 14 to 17 is positioned a second set of walls 18, 19 and 20 reaching from one lateral wall to the other in the chamber, of a height approximately equal to that of walls 14 to 17 but disposed on a higher level, the assembly of walls 14 to 20 constituting a labyrinth slowing down the flow of liquid pumped from one compartment to the other of the chamber and avoiding especially that there be created a current at a level superior to the upper edge of walls 14 to 17, such a current risking to rapidly drive oil towards the left-hand side of the separation chamber, location in which the separation of the liquids must be finished.

The separated liquids are recovered at the outlet of the chamber by two conduits 21 and 22 having valves 23 and 24 differentially coupled so that when one is open the other is closed. Conduit 22 is connected to the bottom of the separation chamber, while conduit 21 is connected to the upper part of the separation chamber. It is thus evident that conduit 22 serves to extract the purified water from the chamber, while conduit 21 serves for recovery of the floating liquid.

It should be noted also that a valve 25 is provided between the pump and the separation chamber, and a valve 26 between the pump and the decompression chamber 5.

The installation thus permits the pumping of the layer of floating liquid 12 by adjusting as best as possible the level of the conduit opening, or of the various valves. The floats 10 and 11 are positioned at a suitable place, and then valves 25, 26 and 7 are opened and pump 3 is started so as to pump the floating liquid and a minimal quantity of water and air. This mixture varies at first in the decompression chamber 5 in which air and possibly other gases can escape through air hose 6. Owing to the position of tube 8 a small pressure in chamber 5 suffices in order that the liquid flows practically by itself through the tubes in this chamber. Pump 3 thus serves first of all to make liquid pass from chamber 5 into separation chamber 2. During pumping, valve 24, located on a level higher than the ceiling of chamber 2 is completely closed while valve 23 is open. The liquid mixture pumped by pump 3 penetrates into the separation chamber in its lower part. It fills successively the compartments formed by the intermediate walls 14 to 17 to penetrate finally in conduit 22. In each of the compartments takes place a separation of the water and of the floating liquid, the floating liquid ascending progressively to the surface. The labyrinth formed by intermediate walls 14 to 20 prevents the floating liquid from being carried by the internal current set up from the entrance 4 to the exit 22 of the separation chamber. This chamber filling progressively, the water level, occupying the lower part 2*b* of the chamber, ascends and finally comes to compress the floating liquid into the upper part 2*a*, under the effect of the pumping force exerted by pump 3. The compressed liquid escapes finally through conduit 21 and valve 23 to be stored in suitable reservoirs or burnt on the spot in the case of a combustible liquid. When the level of water in the separation chamber reaches the ceiling thereof, valve 24 is opened, rendering possible the flow of this water which is thrown out to sea or in a lake.

According to the proportion of the two liquids and to obtain a continuous operation, it is advantageous to open more or less one of the valves 23 and 24 and to close more or less the other of these valves. It is possible to use advantageously two coupled valves in such a way that when one is open the other is closed, the coupling being adjustable, or yet still a differential valve.

During the recovery of a layer of petroleum, the installation will be completed by a large diameter belt surrounding the floating gratings to prevent on the one hand a spread of the layer of the petroleum and on the other hand to reduce this layer by reducing the perimeter of this belt.

The separation chamber is naturally one example as other examples can be provided with a greater number of intermediate walls or a different labyrinth, for example the walls 18, 19 and 20 could contact the ceiling and have openings forming a baffle for the passage of the liquid.

Other modifications can be made in which the tube is not immersed but held above water, only the extremity of the tube being emerged.

Additionally, the separation chamber and the pump can be mounted on the ground.

The valves preferably will be automatically controlled by a float such as shown in FIG. 2. This float 34, immersed, uses the difference in specific gravity between water 33 and oil 32. The float has an intermediate specific gravity in such a way that it maintains itself between the liquid 2 and 3 indicating by its gauge 35 the upper level of water. It suffices then to determine by means of an electric or photo-electric device the position of gauge 35 to control the opening and the closing of valves 23 and 24.

What is claimed is:

1. Installation for the recovery of a liquid floating on the surface of water comprising a liquid separation chamber having a ceiling, pumping means, at least one conduit one of whose extremities is connected to said pumping means and whose other extremity at least is immersed and supported near the water surface, said separation chamber having transverse walls alternately located at different heights for dividing the same into several compartments, and leaving a space between the top of the upper walls and the ceiling of the separation chamber, there being a liquid inlet in the lower part of said chamber, a water outlet in the bottom of said chamber and an outlet for the floating liquid in the ceiling of said chamber, said chamber being hermetically closed.

2. Installation according to claim 1, wherein the outlets for the two liquids are closed by coupled valves which operate simultaneously.

3. Installation according to claim 2, wherein said liquid outlet valves are differentially operated.

4. Installation according to claim 1, having a decompression chamber for evacuating gas contained in the liquid, said decompression chamber being located between said pump and said conduit below water level.

5. Installation according to claim 1, wherein the water outlet comprises a conduit extending from the floor of the chamber to a level even with the ceiling of the chamber.

6. Installation according to claim 2, having an immersed float of a specific gravity comprised between the specific gravity of water and that of the floating liquid, and means for actuating said valves in response to the level of said float.

7. The invention as set forth in claim 1, in which said installation is disposed within a boat and has a plurality of inlet conduits connected with aspirating pumps, the extremity of each conduit being surmounted by an inverted grating forming a cupola for keeping out solid bodies floating on the water surface.

8. Installation according to claim 7, having a belt connecting said gratings to prevent spreading of a layer of viscous liquid floating on a body of water and for reducing the surface area of said layer by reducing the perimeter of said belt.

References Cited

UNITED STATES PATENTS

| 2,782,929 | 2/1957 | Colket | 210—320 X |
| 2,891,672 | 6/1959 | Veld et al. | 210—242 |

JAMES L. DE LESARE, Primary Examiner

U.S. Cl. X.R.

210—242, 320